Sept. 14, 1965   R. L. MEEDER ETAL   3,206,006
PRECISION CONVEYOR

Filed April 15, 1963   3 Sheets-Sheet 1

Inventors:
Raymond L. Meeder
Joseph E. Kus
By: Stone, Nieman,
Burmeister & Gummer
Attorneys Sept. 14, 1965  R. L. MEEDER ETAL  3,206,006
PRECISION CONVEYOR Filed April 15, 1963

Inventors:
Raymond L. Meeder
Joseph E. Kus
By: Stone, Nierman,
Burmeister & Zimmer
Attorneys Inventors:
Raymond L. Meeder
Joseph E. Kus
By: Stone, Wiseman,
Burmeister & Zimmer
Attorneys

United States Patent Office

3,206,006
Patented Sept. 14, 1965

1

3,206,006
PRECISION CONVEYOR
Raymond L. Meeder, Palos Heights, and Joseph E. Kus, Mount Prospect, Ill., assignors to Nuclear-Chicago Corporation, Des Plaines, Ill., a corporation of Delaware
Filed Apr. 15, 1963, Ser. No. 273,067
8 Claims. (Cl. 198—131)

This invention relates to conveyors, and more particularly to a precision conveyor system for use in devices such as automated systems for measurement and recording of properties such as radioactivity of successive samples.

In recent years, there have been developed a number of types of automatic equipment for laboratory measurements on a large number of samples, one type of measurement so made being the measurement of radioactivity, but other types of measurement such as spectrometry, etc., have also been performed on automatic equipment. Such equipment requires some form of conveyor system by which the samples are sequentially brought to the measuring station. The conveyor systems in common use are in general analogous to those used in industrial processing equipment, various forms of turntables, conveyor chains, etc., having been devised for the purpose. Where large numbers of samples are to be measured, one form of conveyor which is highly desirable is the folded or serpentine chain, a form of endless conveyor which has long been used for analogous purposes because of its advantageous utilization of space, permitting loading with a large number of workpieces for sequential disposition at an operating station (such as in bringing photographic slides in position before a lens, etc.) and has accordingly been adopted in the type of automatic measuring device under present discussion.

The conveyor of the present invention is of the chain type just mentioned. For many purposes, such as in the type of device known as the automatic scintillation counting system, such as described in the copending application of Meeder and Kus, Serial No. 184,765, filed April 3, 1962, now Patent No. 3,163,756, very precise location of the successive samples at the operating station is required for fully satisfactory operation. In such a device as described in that application, the operating station at which the conveyor deposits each sample is the top surface of a ram or elevator which then descends into a chamber for measurement of the radioactivity within a sample bottle by counting of the light pulses emitted thereby because of the presence of a scintillator previously commingled with the sample (normally in a solution). In such a device the ultimate positioning of the sample in the counting chamber must be virtually identical in each case because of the necessity of maintaining the optical "geometry" constant in making the measurements fully meaningful, particularly in view of the importance of the exact amplitudes of output pulses of the light detector in such measurements. Accordingly, the location of the bottle on the ram or elevator must be completely reproducible. Although it is of course possible to provide a funnel or other auxiliary positioning means to compensate for error in the exact stopping place of the conveyor, the extent to which this can be done is severely limited if the device is to be kept free of jamming and other difficulties without imposing an undue necessity of care in assuring exact uniformity, etc., of samples.

It is the principal object of the present invention to provide a conveyor system capable of such precision positioning, and at the same time meeting the additional requirements of capability of storing a large number of samples in a relatively small space, while also being not unreasonable in cost.

2

The conveyor system of the present invention, although highly advantageous for use with the device of the above-mentioned copending application, the specific purpose of the embodiment of the invention to be described, has a number of features of novelty which will readily be used in conveyor systems for other purposes. The invention will best be understood from a description of the embodiment thereof illustrated in the annexed drawing, in which:

FIGURE 10 is a view in elevation of a plate or link used in the construction of the illustrated chain conveyor.

Figure 1:
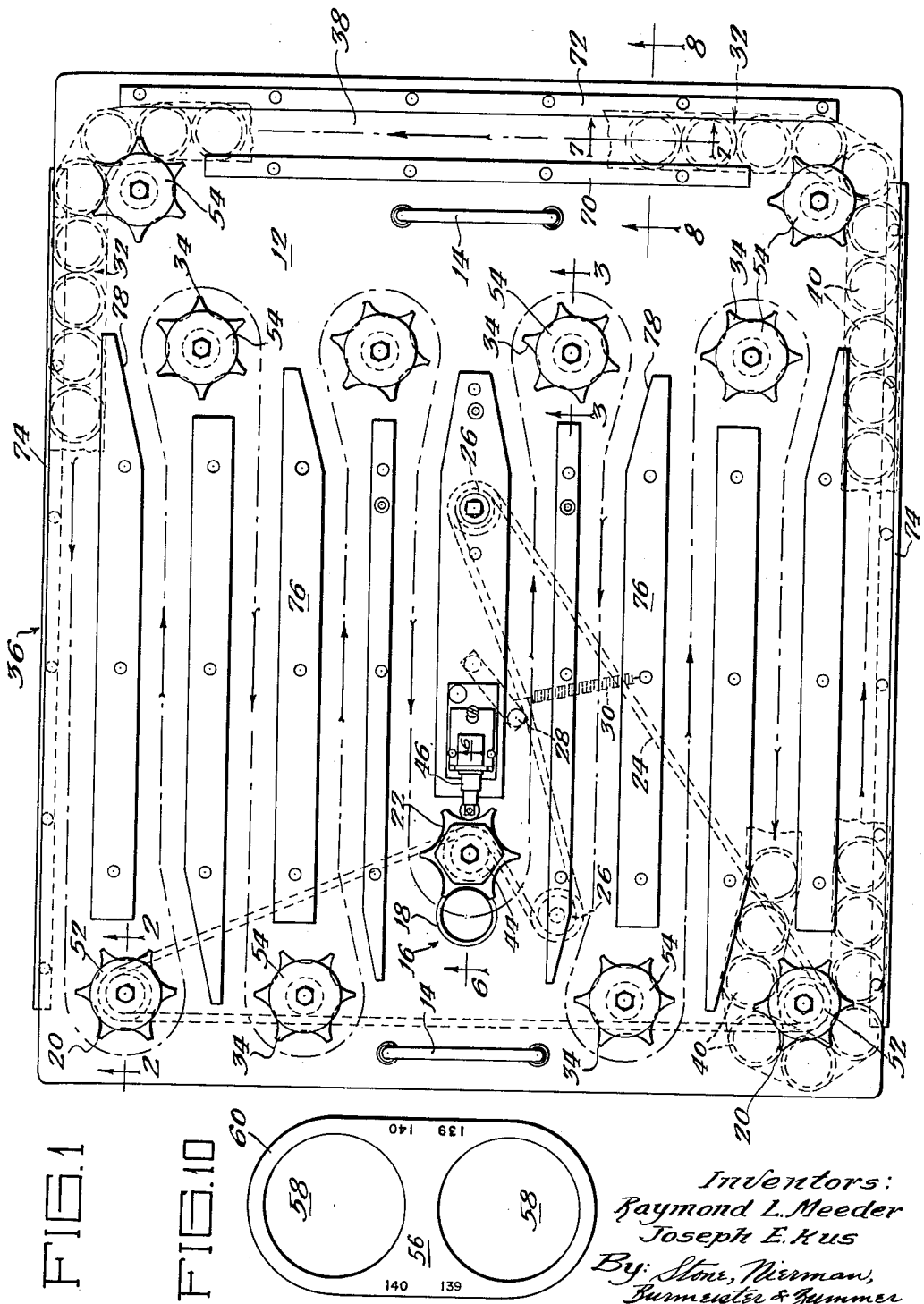
FIGURE 1 is a top view of the conveyor system of automatic equipment for scintillation counting of radioactive samples, made in accordance with the invention.
Figure 2:
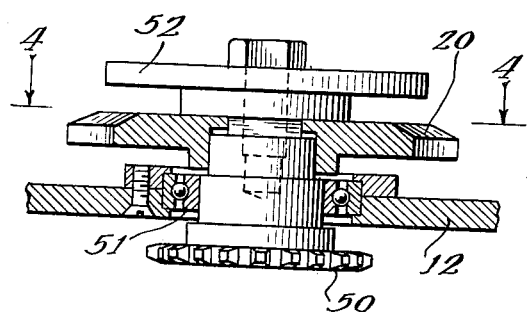
FIGURE 2 is a view partially in elevation and partially in vertical section taken along the line 2—2 of FIGURE 1, of a drive sprocket.
Figure 3:
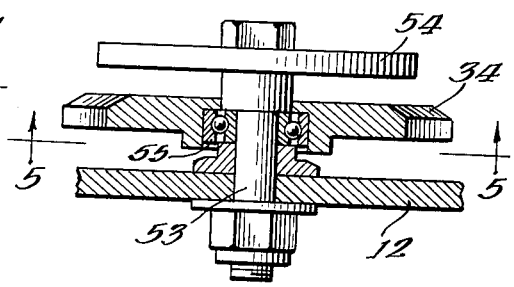
FIGURE 3 is a similar view of an idler sprocket, with the portion in section being taken along the line 3—3 of FIGURE 1 in the direction indicated by arrows.
Figure 4:
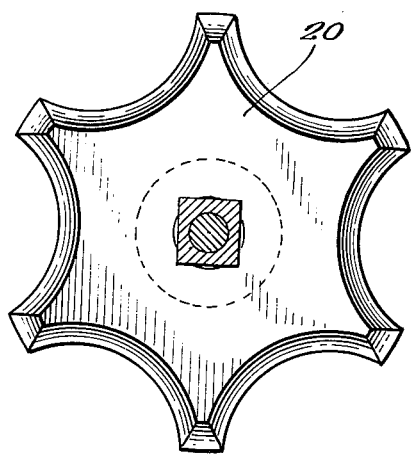
FIGURE 4 is a sectional view taken along the line 4—4 of FIGURE 2.
Figure 5:
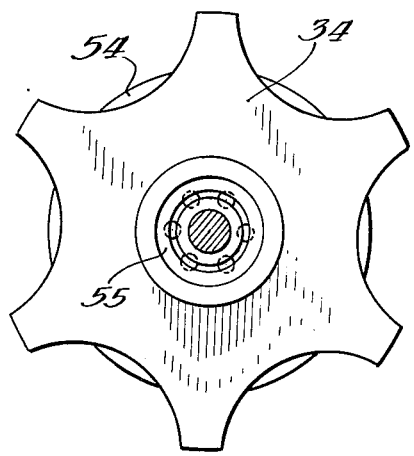
FIGURE 5 is a view taken along the line 5—5 of FIGURE 3.

As seen in FIGURE 1, supplemented by FIGURES 2 through 6, the conveyor assembly is constructed on a flat table 12, provided with handles 14 permitting simple mounting and demounting of the conveyor system on and from the portion of a scintillation counting system beneath the conveyor, of which a typical example is shown in the copending application mentioned above.

Figure 6:
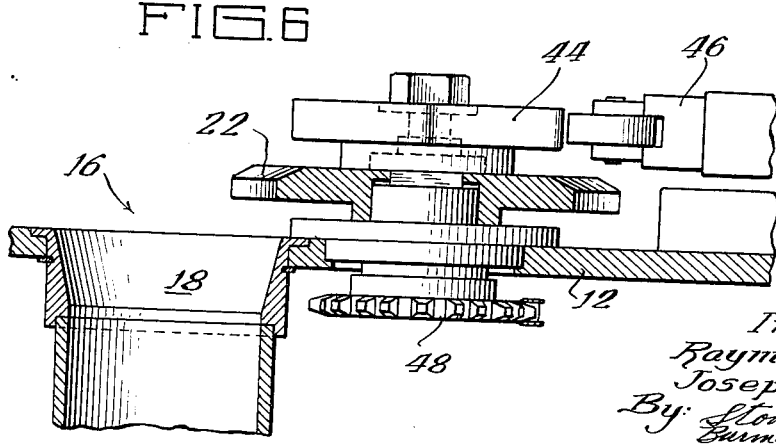
FIGURE 6 is a vertical sectional view taken along the line 6—6 of FIGURE 1, illustrating details of construction at the counting station of the device, partially shown in elevation.

The counting or measuring station at which the conveyor locates successive samples is shown generally at 16. As best seen in FIGURE 6, the table 12 is here apertured, and a collar 18 is located in the table at this point to pass a ram or elevator (not illustrated) which has an upper surface flush with the table surface during the operation of the conveyor, but which drops to a suitable chamber beneath the conveyor for the counting of a sample, the conveyor remaining stationary during the counting operation, and recommencing its motion when the sample is again returned by the ram or elevator. It will be observed that the collar 18 is slightly flared to form a funnel more or less guiding the small bottles or vials used in such systems into exact position as the ram or elevator commences to drop, but it will be observed that the error thus permitted in the positioning by the conveyor must be kept very small, since any attempt to correct such error by enlargement of the flare angle of the funnel will inevitably produce jamming of the samples. It will be understood that the bottles or vials employed are of relatively small size, generally less than an inch in diameter, so that any error in positioning must be extremely small in magnitude.

As may be seen in FIGURE 1, drive sprockets 20 are provided at the corners of the table there shown at the left, and a third drive sprocket 22 is immediately adjacent to the counting or measuring station 16. These three drive sprockets 20 and 22 are driven by a drive chain 24 which is beneath the table 12 (the latter having suitable mounting means or spacers on its lower surface, not illustrated, to permit the mounting of the entire assembly atop the counting chamber assembly previously mentioned). The drive chain 24 also engages idlers 26 and is held in tension by a pivotally mounted roller 28 secured to a suitable spring 30 to prevent backlash errors in the drive system. The conveyor path, as indicated by arrows in the drawing (only fragments of the endless conveyor chain 32 being shown for simplicity of illustration) has the bulk of its length in a folded portion 36, being returned from the end of this folded portion to the commencement through a return portion 38, shown at the right side of FIGURE 1. The chain, later to be described in greater detail, has closely spaced receptacles 40 in the shape of cylindrical rings (see FIGURES 7 and 8) in which the workpieces (bottles shown in dotted form at 42 in the figures just mentioned) which slide along the table 12.

The drive sprocket 22 at the sample station 16 bears a hexagonal cam 44 which operates an indexing switch 46 connected with a relay system (not shown) for exact positioning of samples at the station 16. The drive chain 24, engages a sprocket 48 beneath the table, and a similar sprocket 50 is provided on each of the corner conveyor sprockets 20, the drive being transmitted through the table or plate 12 in all instances by suitable roller bearings 51 mounted in the plate. The idler sprockets 34 for the conveyor chain are mounted on spindles 53 rigidly mounted on the plate 12 and mounting roller bearings 55. The drive sprockets 20 and the idler sprockets 34 have hold-down plates or discs 52 and 54, respectively, which are of a diameter extending beyond the roots of the teeth of the sprockets 20 and 34, so that they overlie the upper surfaces of the links, which pass through the sprocket assemblies supported by the sprocket teeth and prevented from rising too high by this engagement of the edge of each upper link.

The construction of the conveyor chain itself, and the manner in which it cooperates with the sprocket system and guides or slide blocks mounted on the plate 12 to produce precision positioning of samples in a simple and inexpensive manner, are best seen in FIGURES 7 through 10. The latter figure shows the simple form of link employed, consisting of a flat plate 56 with closely spaced circular apertures 58 and with the end 60 rounded to semi-circular form concentric with the respective apertures 58. The receptacles 40 are short tubular cylinders having internal bevels 62 and 64 at the top and bottom, respectively, to facilitate the insertion of the samples 42 from the top and also to guide samples rising on the elevator back to proper location to permit a very slight tolerance of exact positioning, as previously described in connection with the collar 18. The receptacles 40 are formed with upwardly facing shoulders 66, upon which are seated the opposite end portions of adjacent links, which are held in place by snap rings 68 fitting suitable grooves in the outer surface of the receptacles 40.

Figure 7:
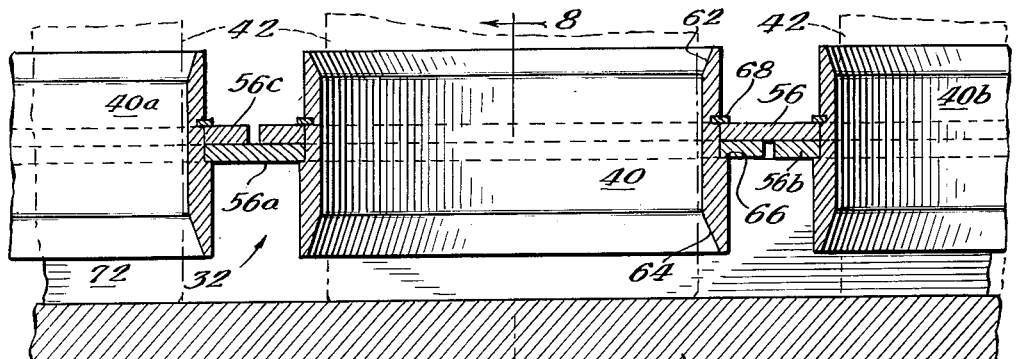
FIGURE 7 is a greatly enlarged sectional view taken along the line 7—7 of FIGURE 1 (this section also being shown by the same designation in FIGURE 9) showing the construction of the conveyor chain of the invention.
Figure 9:
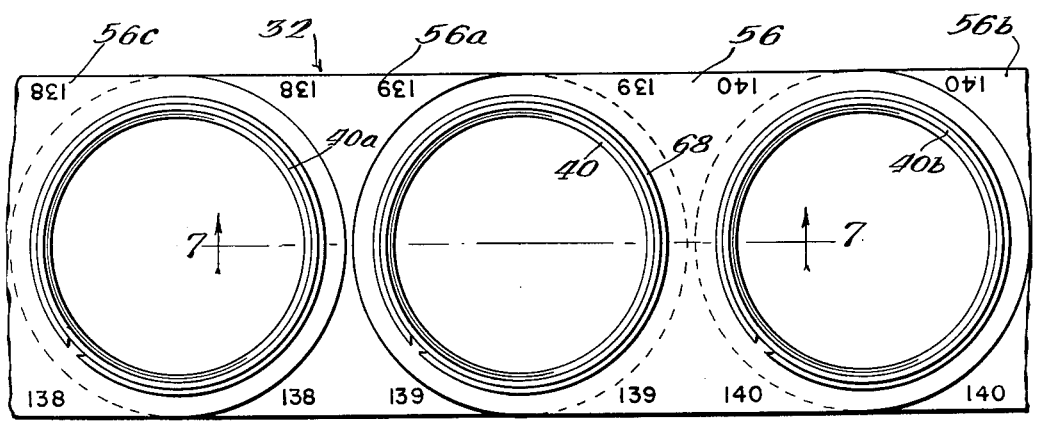
FIGURE 9 is an enlarged fragmentary top view of the conveyor chain.

As seen in FIGURES 7 and 9, the links or plates are alternated in vertical position. The receptacle 40 of these figures is at the left end of link 56 and the right end of link 56a, the latter being one of the lower links and the former being one of the upper links. The receptacle 40b, which is seated in the right end of the link 56 is also seated in the left end of link 56b, which is again a lower link. Likewise, the link 56c, which is joined to the link 56a by the receptacle 40a is again an upper link.

As shown in the drawing, each link is marked with a number (reversed in orientation on the two edges) representing the number of the sample receptacle by which it is joined to the next. These numbers are near the center line of the space between the two apertures, which is made just sufficiently long so that numbers on the lower links are not covered by the annular end portions of upper links, even when the links are disposed at the sixty degree angles which are their maximum misalignment, occurring on the sprockets. The receptacles (the particular embodiment illustrated has 150, this being a typical utilization) are thus easily identified from virtually any angle, irrespective of their position, so that the identification of the samples placed therein or to be taken therefrom is easily made. It will of course be understood that equipment of the type for which the embodiment of the invention herein described is designed, i.e., liquid scintillation counting equipment, records data with identification of samples in terms of their receptacle number.

Figure 8:
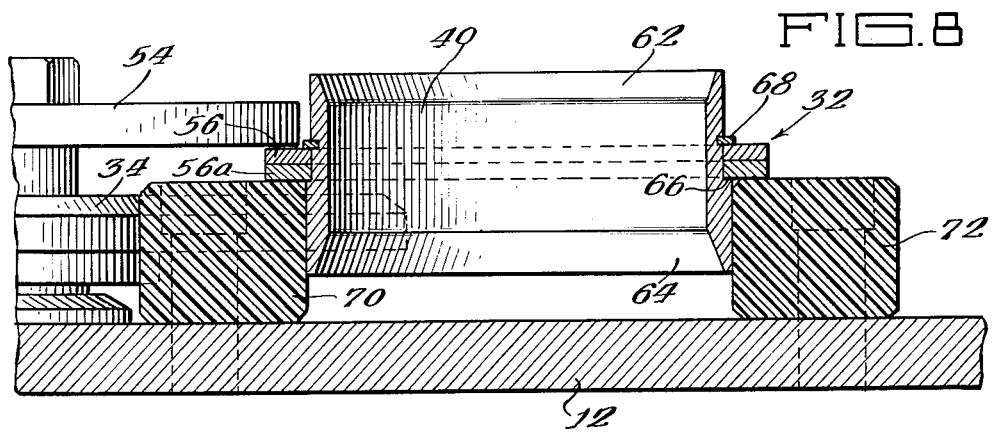
FIGURE 8 is a sectional view taken along the line 8—8 of FIGURE 7 (also shown by the same designation in FIGURE 1)

In all but the very short regions where the path of the chain is altered by passage through a sprocket (drive or idler), the edges of the chain, as seen in FIGURE 8, slide on guide blocks of bearing material, such as a type of plastic employed for such purposes. These blocks vary somewhat in details of shape and size, those illustrated in FIGURE 8 being, of course, the blocks 70 and 72 which bound the return path 38. The edge blocks 74 and the blocks 76 forming the folded path are of various widths, but in every case the spacing between opposed blocks is such as to fairly tightly hold or confine the lower portion of the receptacles, as shown in FIGURE 8. Diagonal bevels 78 are employed in many instances for the purpose of guiding the receptacles onto and from the sprockets.

It will readily be seen that with the construction described, the receptacles serve the combined function of pivots joining the chain links and members engaged by the sprockets, in addition to serving as receptacles. The chain structure is readily assembled and easily disassembled for cleaning, and may be made simply from easily cleaned materials such as, for example, stainless steel.

The scope of the invention is of course not limited to the particular embodiment illustrated and described, and should accordingly be determined only in terms of structures described in the appended claims, and equivalents thereof.

What is claimed is:
1. A conveyor system comprising
 (a) links each consisting essentially of a rigid member having apertures at the ends thereof,
 (b) workpiece receptacles extending through the apertures of adjacent links for pivotal connection thereof and means for holding the receptacles and links together to maintain such connection, and
 (c) sprocket wheels engaging the outer surfaces of the workpiece receptacles,
 (d) the workpiece receptacles thus receiving the workpieces conveyed, joining the links into a unitary chain and providing surfaces for engagement by the sprocket wheels.
2. A conveyor system comprising
 (a) links each consisting essentially of a flat plate having apertures at the ends thereof,
 (b) workpiece receptacles extending through the apertures of adjacent links for pivotal connection thereof and means for holding the receptacles and links together to maintain such connection, and
 (c) sprocket wheels engaging the outer surfaces of the workpiece receptacles,
 (d) the workpiece receptacles thus receiving the workpieces conveyed, joining the links into a unitary chain and providing surfaces for engagement by the sprocket wheels.
3. The conveyor system of claim 2 having slide members at each side of its path, the edges of the links resting on the slide members.
4. The conveyor system of claim 2 wherein alternate plates overlie the respectively adjacent plates at both ends.

5. The conveyor system of claim 2 having
  (e) the plates having closely spaced round apertures in the respective end portions thereof,
  (f) the apertures being of a diameter slightly less than the width of the plate, and
  (g) the edges of the ends being of circular configuration concentric with the respective apertures.

6. The conveyor system of claim 5 having
  (h) the receptacles consisting of annular rings seated in respective pairs of apertures,
  (i) said rings having integral external shoulders seating one member of each pair of adjacent links, and
  (j) shoulder-forming fastening members on the receptacles confining the other members of the pairs.

7. The conveyor system of claim 5 wherein each plate has on the upper surface thereof, spaced from each aperture by a distance slightly greater than the difference between the radii of the concentric ends and apertures, a visual identification of the receptacle in each aperture, so that the identification of each receptacle is visible on each side of the receptacle.

8. A precision conveyor system for movement of successive workpieces to an operating station comprising
  (a) a continuous chain consisting of successive links, each link comprising a flat plate having two closely spaced round apertures therein of a diameter slightly less than the width of the plate, the apertures in each link being in register with the oppositely located apertures in respectively adjacent links,
  (b) a workpiece receptacle in each pair of apertures so in register, the receptacles having round outer surfaces substantially filling the apertures and pivotally connecting the links, and means for holding the receptacles and links together to maintain such connection,
  (c) the edges of the ends of the links being circularly concentric with the apertures therein,
  (d) guide bars at the sides of the chain slidingly supporting the edges of the links,
  (e) sprocket wheels having teeth engaging the outer surfaces of the workpiece receptacles,
  (f) the portions of the receptacles below the links fitting in sliding relation between the guide bars,
  (g) at least a portion of the sprocket wheels having hold-down members overlying the upper edges of the receptacles.

No references cited.

SAMUEL F. COLEMAN, *Primary Examiner.*
ERNEST A. FALLER, *Examiner.*